June 20, 1939.  L. C. HUSE  2,163,123
MEAT-TENDERING MACHINE
Filed Oct. 21, 1936   2 Sheets-Sheet 1

Inventor
Leon C. Huse
by Roberts, Cushman & Woodberry
Att'ys.

June 20, 1939.  L. C. HUSE  2,163,123
MEAT-TENDERING MACHINE
Filed Oct. 21, 1936  2 Sheets-Sheet 2
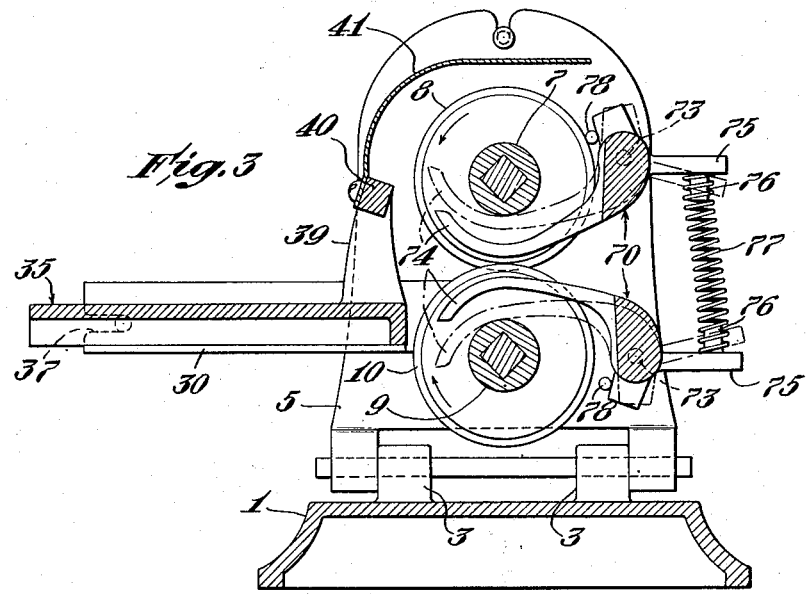
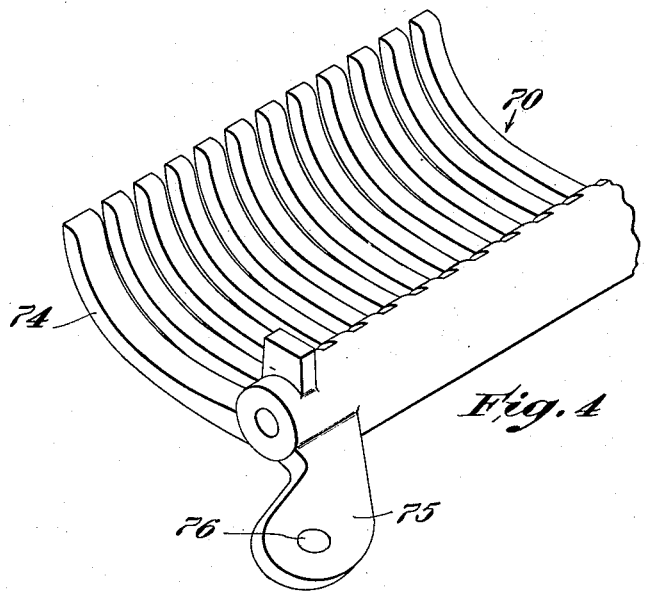
Inventor
Leon C. Huse
by Roberts, Cushman & Woodberry
att'ys.

Patented June 20, 1939

2,163,123.

UNITED STATES PATENT OFFICE 2,163,123

MEAT-TENDERING MACHINE

Leon C. Huse, Laconia, N. H.

Application October 21, 1936, Serial No. 106,715

2 Claims. (Cl. 17—26)

This invention relates to an improved meat tendering machine, and particularly to such a machine adapted effectively to treat both sides of a slice of meat or the like. The present invention may be employed with a meat tendering machine of the character disclosed in my United States Patent No. 1,973,284, issued September 11, 1934, or it may be employed with various other machines having cooperating meat treating rolls provided with disks or the like.

In accordance with this invention, cooperating guide means may be associated with the rolls so that localized portions of the meat are uniformly pressed against the rolls. Such guiding means may be arranged so that meat slices of different thicknesses may be directed between the rolls and have both faces thereof substantially uniformly treated.

For this purpose the guiding means may comprise fingers disposed, for example, between the disks of one roll and opposed to the disks of the other roll, these fingers being yieldably urged toward the opposed disks. The fingers preferably may be shaped so that slices of meat being fed to the rolls are centered relative to the bite of the rolls despite differences in the thickness of said slices. Preferably the guides may comprise pivoted portions and portions connected by springs so that the fingers urged toward each other and the opposite faces of the meat slice may be subject to equal pressures.

Preferably the guiding means may be arranged so that the machine may be readily disassembled for cleaning. Thus, for example, as disclosed in my above-identified patent, the machine may have a frame provided with two uprights normally connected by a yieldable tie bar, one of the uprights being pivotally mounted and swingable downwardly to permit the rolls to be removed from the frame. The guides, which are provided in accordance with this invention, may be mounted so that they may be separated from the frame when the upright is swung downwardly.

A further aspect of the invention relates to the arrangement of a feed table to cooperate with the fingers of the guides in properly centering slices of meat relative to the bite of the rolls despite variations in the thickness of said slices. Preferably such a table may be arranged to support a guard plate in spaced relation to the plane of the table, this plate cooperating with the table in defining a passage through which the meat slices pass to the bite of the rolls and to the guides.

In the accompanying drawings:

Fig. 3 is a central section indicated by line 3—3 of Fig. 1; and

Fig. 4 is an isometric view of part of one of the guides.

Figure 1:
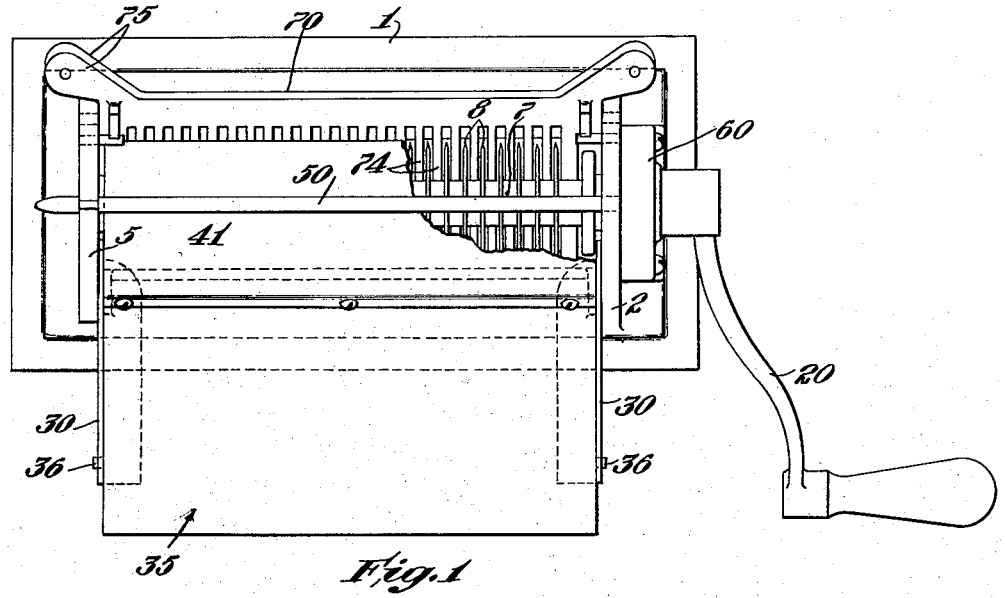
Fig. 1 is a broken top plan view of a typical machine embodying the principles of the present invention.

As shown in the accompanying drawings, the principles of the present invention may be employed with a machine of the general character disclosed in my above-identified United States patent. Such a machine comprises a metal base 1 having an integral upright or end plate 2 and providing integral lugs 3 which receive a hinge pin 4 supporting the lower part of a pivotally mounted end plate 5. The pintle 4 provides a horizontal axis so that the end plate 5 may swing downwardly from its normal position.

Meat tendering rolls 7 and 9 are rotatably mounted on the uprights 2 and 5. The upper roll 7 may be provided with a plurality of disks 8 having relatively sharp beveled peripheries while the lower roll 9 may be provided with similar disks 10. The disks 8 and 10 are staggered relative to one another, as shown particularly in Fig. 2 and their peripheries may slightly overlap each other as viewed from the side (see Fig. 3).

Rotatably mounted upon the fixed upright 2 are upper and lower gears 11 and 12 (Fig. 2) which have hub portions rotatable in openings in the upright 2. These hub portions may be provided with square recesses slidably engaging axial extensions of the rolls 7 and 9 so that the rolls may be disengaged from these hub portions when the upright 5 is swung downwardly toward a substantially horizontal position. The gears 11 and 12 are in meshed engagement with each other and the lower roll 9 has an axial extension 16 to provide a shank in interfitting engagement with a detachable crank 20. The opposite ends of rolls 7 and 9 are provided with axial extensions which engage corresponding openings in the swinging upright 5. The axial extensions of the rolls preferably may be somewhat tapered to facilitate their disengagement from the frame when the plate 5 is swung downwardly to a substantially horizontal position.

A detachable cover 60 may be secured to the upright 2 to conceal the gears 11 and 12. A resilient tie bar 50 has one end fixed in the upper part of the stationary upright 2 and has an opposite portion 51 of reduced diameter engageable in a shallow slot in the upper part of plate 5.

The tie bar 50 normally serves to hold the plate 5 in a vertical position, but the end of this resilient bar may be sprung upwardly to disengage it from the shallow slot in the upper part of the upright 5, thus permitting the plate 5 to be swung downwardly.

Parallel angle members 30 are secured by screw fastening means to the uprights 2 and 5 providing horizontal ledges which support a feed table, designated generally by numeral 35. This table preferably may be in the form of an aluminum casting and is provided with outstanding pins 36 which engage horizontal slots 37 (Fig. 3) in the ends of arms 30. Thus in the normal position of the feed table, its edges rest on the horizontal flanges of the angles 30 while the pins 36 are disposed in the inner ends of the slots 37. The machine as so far described is of the same general type as is more fully disclosed in my above-identified patent.

Figure 2:
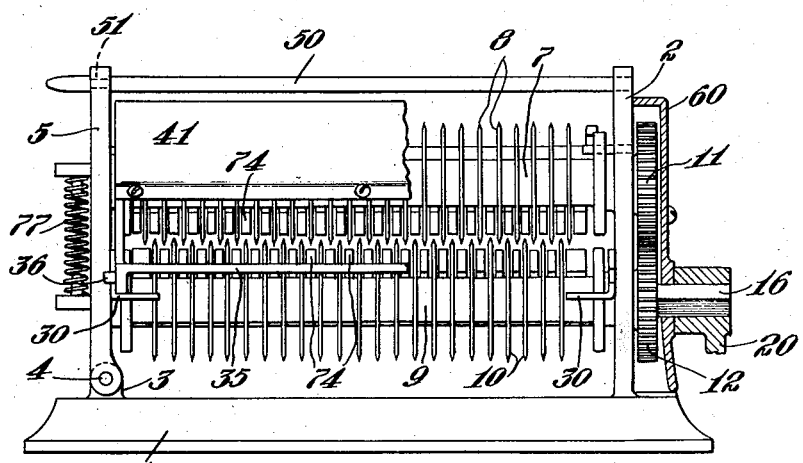
Fig. 2 is a front elevation of such a machine with parts broken away and shown in section.

In accordance with this invention, improved guide means may be associated with such a machine or with any similar machine having cooperating treating rolls provided with cutting disks or the like. Such guide means may comprise similar upper and lower guides 70 which may conveniently be in the form of aluminum castings. The ends of these guides may be pivoted on pins 73 extending from the end plates 2 and 5, thus providing pivotal mountings so that each of the guides may swing about a horizontal axis remote from the bite of the treating rolls. The guides 70 have curved surfaces which extend toward each other in the region of the bite of the rolls and the major portion of the guides are provided with guide fingers 74 which have end portions with curved surfaces having curvatures substantially corresponding to those of the cutting disks of the treating rolls (Fig. 3). Thus the ends of the fingers curve away from each other, the lower fingers terminating near the table 35. The fingers 74 extend between the cutting disks 8 and 10 and the fingers 74 of the upper guide have their guide surfaces opposed to the edges of the disks of the lower roll 9, while the corresponding surfaces of the lower guide fingers are similarly opposed to the edges of the disks of the upper roll (Fig. 2).

The ends of the guides 70 are provided with outstanding ears 75 having studs 76 which fit within the ends of compression springs 77, there being one of these springs 77 at each end of the machine. Thus the fingers 74 are yieldably urged toward each other, the end plates 2 and 5 being provided with suitable stop pins 78 to limit the swinging movement of the guides under the action of the springs 77. It is evident, however, that the fingers 74 may be pushed apart against the action of the springs 77. Such a movement of the fingers is limited by engagement with the axial portions of the respective rolls.

Integral extensions 39 extend upwardly from the ends of the inner portion of the feed table 35 and support a crossbar 40. A curved sheet metal guard plate 41 may have its lower edge secured to the crossbar 40 of the feed table and may extend over the cutting disks 8 of the upper treating roll, as shown more particularly in Fig. 3.

In the normal operation of a machine of this character, the crank 20 is rotated thus to rotate the rolls 7 and 9 in the directions indicated by the curved arrows in Fig. 3. The slice of meat to be treated is placed upon the feed table 35 and pushed inwardly toward the bite of the rolls, passing between the bar 40 and the table 35 and engaging the fingers 74 and the edges of the cutting disks. Since the disks are being rotated in the directions indicated in Fig. 3, the meat is drawn to the bite of the rolls. As this occurs, the fingers 74 of the respective guides are separated by the meat against the action of the springs 77. Each finger, however, tends to press a localized portion of the meat slice against the cutting edge of the opposed disk, and since equal pressures are imposed by the upper and lower guides, both sides of the meat slice are substantially uniformly pressed against the cutting disks.

It is furthermore evident that the guides prevent the meat from clinging to the cutting disks and that each face of the meat slice is provided with a plurality of parallel shallow cuts. If desired, the meat may be passed between the rolls twice so that the cuts provided by the disks 8 and 10 may extend transversely of each other.

When it is desired to clean a machine of this character, the table 35 and the guard plate 41 may be removed from the frame by sliding the table outwardly so that the pins 36 are disengaged from the slots 37. Thereupon the resilient tie bar 50 may be sprung upwardly to release the end plate 5 so that the latter swings downwardly and is disengaged from the ends of rolls 7 and 9 as well as from the guides 70. The rolls 7 and 9 may then be slid out of engagement with the upright 2 and the crank 20, while the guides 70 are similarly disengaged from the end plate 2.

It is thus evident that the treating rolls, the feed table, and the guides may be separated from the frame and from each other to permit convenient cleaning of these parts and that no tools are necessary to permit this disassembly of the parts, although in practice I prefer to employ a suitable holder to hold the upper treating roll 7 spaced from the lower roll 9, when the upright 5 is swung downwardly.

Obviously the parts may be reassembled by reengaging the square ends of rolls 7 and 9 with the hubs of the corresponding gears and by engaging the pins 73 at the ends of the guides 70 with the corresponding openings in the plate 2 and by then swinging the plate 5 upwardly and bringing the openings therein into engagement with the corresponding axial extensions of the rolls and the pins 73 into engagement with the guides. Thereupon the tie bar 50 may be sprung into its normal position to hold the plate 5 in place, and thereafter the feed table 35 and the guard 41 may be restored to their normal positions by merely sliding the table inwardly until the pins 36 engage the notches 37.

It is evident that the present invention affords a simple and effective meat tendering machine which is particularly efficient in assuring the substantially uniform treatment of opposite faces of a meat slice and in preventing possible crimping of the meat as it passes between the treating rolls. It is furthermore evident that such a machine is particularly adapted to treat meat slices of widely different thicknesses.

It should be understood that the present disclosure is for the purpose of illustration only and that this invention includes all modifications and equivalents which fall within the scope of the appended claims.

I claim:

1. A meat tendering machine comprising a frame, a pair of cooperating parallel meat treating rolls each having a plurality of cutting disks, the disks on one roll being staggered relative to the disks on the other roll, a pair of guides, each guide having a plurality of fingers each extending between the disks of one roll and providing a guide surface intersected by the plane of a disk of an opposing roll, said guides being pivotally mounted on the frame, springs yieldably urging the fingers of the respective guides toward each other so that the fingers of each guide are yieldably urged toward the disks of the other guide.

2. A meat tendering machine comprising a base, spaced uprights extending upwardly from the base, a pair of cooperating meat treating rolls having their ends rotatably mounted on the uprights, said rolls having disks arranged in staggered relation, a pair of guides pivotally mounted on the uprights and each having fingers extending between the disks of one roll and opposed to the disks of the other roll, springs connecting the guides and tending to urge the fingers toward each other, whereby a space of variable size is provided to receive a meat slice.

LEON C. HUSE.